United States Patent [19]
Horiguchi et al.

[11] Patent Number: 5,703,288
[45] Date of Patent: Dec. 30, 1997

[54] THERMALLY-SENSITIVE TYPE FLOW METER HAVING A HIGH ACCURACY

[75] Inventors: Hiroyuki Horiguchi, Yokohama; Yoshinobu Nakayama, Kawasaki, both of Japan

[73] Assignees: Ricoh Company, Ltd., Tokyo; Ricoh Elemex Corporation, Nagoya; Ricoh Seiki Company, Ltd., Tokyo, all of Japan

[21] Appl. No.: 682,162

[22] Filed: Jul. 17, 1996

[30] Foreign Application Priority Data

Jul. 19, 1995 [JP] Japan .................................. 7-182537
Jan. 25, 1996 [JP] Japan .................................. 8-010922

[51] Int. Cl.$^6$ ............................................. G01F 1/68
[52] U.S. Cl. ............................................. 73/204.26
[58] Field of Search ...................... 73/204.26, 204.22, 73/204.14

[56] References Cited

U.S. PATENT DOCUMENTS

| | | | |
|---|---|---|---|
| 4,319,483 | 3/1982 | Durham, Jr. et al. | 73/204.25 |
| 4,651,564 | 3/1987 | Johnson et al. | 73/204.26 |
| 5,410,912 | 5/1995 | Suzuki | 73/204.22 |

FOREIGN PATENT DOCUMENTS

| | | |
|---|---|---|
| 55-11938 | 9/1981 | Japan . |
| 3-52028 | 8/1991 | Japan . |
| 3-248018 | 11/1991 | Japan . |
| 6-43906 | 6/1994 | Japan . |
| 7-3351 | 1/1995 | Japan . |

*Primary Examiner*—George M. Dombroske
*Assistant Examiner*—Jewel V. Artis
*Attorney, Agent, or Firm*—Oblon, Spivak, McClelland, Maier & Neustadt, P.C.

[57] ABSTRACT

A thermally-sensitive type flow meter measures a flow rate with a high accuracy by eliminating a noise generated in a source voltage. The flow meter includes a sensor chip comprising a substrate carrying sensing elements. First and second resistors are provided on first and second bridges formed over a depression formed on the substrate. The first bridge is positioned on an upstream side and the second bridge is positioned on a downstream side. The first and second resistors generate a heat by the same voltage source. First and second temperature measuring resistors are provided adjacent to the first and second resistors, respectively, to measure a temperature of the first and second resistors. Third and fourth temperature measuring resistors are provided for measuring the temperature of the fluid. A temperature control unit, including the first, second, third and fourth temperature measuring resistors, controls a temperature of each of the first and second resistors to be constant. A flow rate of the fluid is determined based on a voltage difference between a first voltage applied to the first resistor and a second voltage applied to the second resistor.

22 Claims, 10 Drawing Sheets

5,703,288

THERMALLY-SENSITIVE TYPE FLOW METER HAVING A HIGH ACCURACY

BACKGROUND OF THE INVENTION

1. Field of the Invention

The present invention generally relates to flow meters and, more particularly, to a thermally-sensitive type flow meter using a heating element formed on a semiconductor substrate.

2. Background of the Invention

Recently, a flow rate measuring method has been suggested using a thermally-sensitive type flow meter in which heating elements are provided on a semiconductor substrate so as to measure a temperature drop due to a cooling effect of fluid flowing around the heating elements. Such a flow meter is suggested, for example, in Japanese Laid-Open Patent Application No. 55-119381 and Japanese Patent Publications No. 3-52028 and No. 6-43906.

FIG. 1 is a cross-sectional view of a part of the thermally-sensitive type flow meter disclosed in Japanese Patent Publication No. 3-52028. This flow meter uses a sensor comprising a silicon (Si) substrate having a surface corresponding to a (100) plane. A depression 2 is formed in the surface corresponding to the (100) plane. Two bridges 3 and 4 extending in a 45-degree direction relative to a <110> axis of the substrate are provided over the depression 2. Resistor elements 5 and 6, which correspond to heating elements, are provided on the respective bridges 3 and 4. FIG. 2 is a circuit diagram of a driving circuit for the resistor elements 5 and 6. The driving circuit provides voltage to the resistor elements 5 and 6. The resistor elements are connected to respective amplifiers 7 and 8 so that a voltage difference between the output voltage of the amplifiers 7 and 8 is obtained as an output voltage $V_0$.

In the above-mentioned conventional flow meter, if a flow of fluid is generated in a direction (X-direction) indicated by an arrow X of FIG. 1 above the depression 2 of the substrate 1, the resistor element 5 provided on the bridge 3 is cooled, whereas the resistor element 6 provided on the bridge 4 is warmed up a little since a heat is supplied from an upper stream side. Thus, the output voltage $V_0$ at the amplifier 9, which is a difference between the voltage between the amplifiers 7 and 8, corresponds to a component of flow rate in which a fluctuation in source voltage is eliminated. Accordingly, a flow measurement can be performed with an improved signal-to-noise ratio (SN ratio). Additionally, the depression 2 can be fabricated by an anisotropic etching method since a longitudinal direction of the bridges 3 and 4 is set in the 45-degree direction relative to the <110> direction of the substrate 1.

When the depression 2 is formed on the (100) plane of the Si substrate as shown in FIG. 1, the following problem happens. That is, the depression 2 is normally formed by using an alkaline solution such as KOH and utilizing the nature of the substrate that the etching rate differs depending on directions of crystal faces. A relationship between the etching rates corresponding to the crystal faces (100), (110) and (111) is represented as follows.

$$(100) > (110) >> (111) \qquad (1)$$

This relationship is a property of anisotropic etching. When the depression 2 is formed on the (100) plane by using an alkaline solution as shown in FIG. 3, an etching rate in the Y-direction corresponding to the etching of a side wall of the depression 2 is almost equal to an etching rate in the Z-direction (depth) corresponding to the etching of the (100) plane. Thus, if the depth of the depression 2 is increased, the etched amount of the side walls of the depression 2 is also increased. That is, side walls are formed as slanting surfaces, and thus large side etched portions 10 are formed in the side wall area of the depression 2.

If the large side etched portions 10 are formed as shown in FIG. 3, the design width La of the depression 2 is undesirably increased to a width Lb. This influences the length of the bridges 3 and 4. That is, the actual length Lb of the bridges 3 and 4 must be considerably longer than the design length La, as shown in FIG. 4. Accordingly, a strength of the bridges 3 and 4 is decreased. Additionally, the depth of the side etched portion in the Y-direction is dispersed due to dispersion of the anisotropic etching effect. This causes variation in the thermal isolation of the bridges 3 and 4 which requires a severe control of the manufacturing process. Further, the resistance of the resistor elements 5 and 6 is varied since the temperature of the bridges 3 and 4 is varied due to an increase of the bridge length. Generally, sensitivity of a thermally-sensitive type flow meter is dependent on the temperature of the heating element. Accordingly, at higher flow rate, an upstream heating element and a downstream heating element shows almost the same temperature and there is no linearity between the flow rate and difference value between the output voltages of the resistor elements 5 and 6. Thus, it is difficult to achieve an accurate measurement by the above-mentioned conventional method.

Additionally, Japanese Patent Publication No. 7-3351 and Japanese Laid-Open Patent Application No. 3-248018 disclose thermally-sensitive type flow meters in which a difference in two output voltages is obtained so as to improve an SN ratio.

The flow meter disclosed in Japanese Patent Publication No. 7-3351 has heating elements on opposite surfaces of a supporting member. The heating elements are connected in series, and the front face, for example, of the supporting member is positioned perpendicular to a flow stream line and toward the upstream side. In this state, the heating elements are heated so that an average temperature of the heating elements of the front face and back face (upstream and downstream) is always maintained to be a predetermined temperature higher than the temperature of the fluid. A flow rate is measured by a voltage difference between the two heating elements. In this method, variation in the resistance of the heating element positioned on the upstream side is large and is linear to the flow rate and that of the heating element positioned on the downstream side is small and is non-linear to the flow rate because of the turbulent flow occurred at the edge of the supporting member. Thus, an output (voltage difference of the heating elements) versus flow rate characteristic curve becomes non-linear, and thus it is difficult to take a measurement with a high accuracy.

In the flow meter disclosed in Japanese Laid-Open Patent Application No. 3-248018, heaters are rolled up around the bypath of a fluid passage at the upstream position and the downstream position. A flow rate of the fluid is measured by a voltage difference applied to the heaters by controlling the voltages provided to the heaters so that the resistances or the temperatures of the heaters are equalized to each other. In this method, a large power is necessary for heating the tube at the bypath. Thus, this method is not appropriate for an application in which a measurement should be taken in a small area with a low power consumption.

SUMMARY OF THE INVENTION

It is a general object of the present invention to provide an improved and useful thermally-sensitive type flow meter in which the above mentioned problems are eliminated.

A more specific object of the present invention is to provide a thermally-sensitive type flow meter which can measure a flow rate with a high accuracy by eliminating a noise generated in a source voltage.

Another object of the present invention is to provide a thermally-sensitive type flow meter which can measure a flow rate based on a linear relationship between a flow rate of a fluid and a voltage difference between two heating elements.

Another object of the present invention is to provide a thermally-sensitive type flow meter in which a temperature of a heating element is measured without a time delay.

In order to achieve the above-mentioned objects, there is provided according to one aspect of the present invention a thermally-sensitive type flow meter for measuring a flow rate of a fluid, the flow meter including a sensor chip comprising a substrate carrying sensing elements, the flow meter comprising:

first and second bridges formed over a depression formed on the substrate, the first and second bridges being arranged along the direction of flow so that the first bridge is positioned on an upstream side and the second bridge is positioned on a downstream side;

first and second resistors for generating a heat, the first and second resistors provided on the respective one of the first and second bridges, the first and second resistors being heated by the same voltage source;

first and second temperature measuring resistors provided adjacent to the respective one of the first and second resistors;

third and fourth temperature measuring resistors for measuring a temperature of the fluid, the third and fourth temperature measuring resistors being located at positions not influenced by a temperature of the first and second resistors;

a temperature control unit, including the first, second, third and fourth temperature measuring resistors, for controlling a temperature of each of the first and second resistors to be constant; and a flow rate determining unit for determining a flow rate of the fluid flowing around the first and second bridges, a determination being made based on a voltage difference between a first voltage and a second voltage, the first voltage being measured across the first resistor, the second voltage being measured across the second resistor.

According to this invention, when the fluid flows around the first and second bridges, the first resistor provided on the first bridge and the second resistor provided on the second bridge are subjected to the flow of the fluid. Thus the first resistor is cooled. The cooling effect on the first resistor is proportional to the flow rate. On the other hand, the temperature of the second resistor, which is provided on the downstream side of the first resistor, is not changed since a heat generated in the first resistor is transmitted to the second resistor via the fluid flow or on the second bridge a heat from the upstream part of the resistor is transferred to the downstream part of it via the fluid flow. Thus, a higher voltage is applied to the first resistor to maintain a constant temperature, whereas a voltage applied to the second resistor is maintained to be constant. This means that the first voltage measured across the first resistor is increased as the flow rate is increased, and the second voltage measured across the second resistor is constant irrespective of the flow rate. Since the same source voltage is used for applying the first voltage and the second voltage, the voltage difference between the first voltage and the second voltage is not effected by fluctuation or noise generated in the source voltage. Additionally, a linear relationship is obtained between the voltage difference and the flow rate, resulting in a flow measurement with a high accuracy.

Additionally, there is provided according to another aspect of the present invention a thermally-sensitive type flow meter for measuring a flow rate of a fluid, the flow meter including a sensor chip comprising a substrate carrying sensing elements, the flow meter comprising:

first and second bridges formed over a depression formed on the substrate, the first and second bridges being arranged along the direction of flow so that the first bridge is positioned on an upstream side and the second bridge is positioned on a downstream side;

first and second resistors for generating a heat, the first and second resistors provided on the respective one of the first and second bridges, the first and second resistors being heated by the same voltage source;

first and second temperature measuring resistors for measuring a temperature of the fluid, the first and second temperature measuring resistors being located at positions not influenced by a temperature of the first and second resistors;

a temperature control unit, including the first and second resistors and the first and second temperature measuring resistors, for controlling a temperature of each of the first and second resistors to be constant; and a flow rate determining unit for determining a flow rate of the fluid flowing around the first and second bridges, a determination being made based on a voltage difference between a first voltage and a second voltage, the first voltage being measured across the first resistor, the second voltage being measured across the second resistor.

According to this invention, similar to the previously mentioned invention, since the same source voltage is used for applying the first voltage and the second voltage, the voltage difference between the first voltage and the second voltage is not effected by fluctuation or noise generated in the source voltage. A linear relationship is obtained between the voltage difference and the flow rate, resulting in a flow measurement with a high accuracy. Additionally, the change in the temperature of the first and second resistor is measured by the change in the resistances of the first and second resistors. Thus, there is no time delay in measuring the change in the temperature of the first and second resistors which time delay may occur where the change in temperature is measured by a separate element.

In one embodiment of the present invention, the first and second bridges may extend perpendicular to the direction of flow. Alternatively, the first bridge may extend perpendicular to the direction of flow and the second bridge may extend parallel to the direction of flow.

Additionally, the substrate may be comprised of a semiconductor substrate having a (110) plane and a <100> axis, the depression being formed on a surface corresponding to the (110) plane, the first bridge extending in a direction 55 degrees inclined with respect to the <100> axis. Alternatively, the substrate may be comprised of a semiconductor substrate having a (110) plane and a <100> axis, the depression being formed on a surface corresponding to the (110) plane, the first bridge extending in a direction parallel to the <100> axis. This eliminates an under-etching of the depression formed on the substrate.

Additionally, a flow direction determining unit may be provided for determining a direction of flow based on whether the voltage difference is a positive value or a negative value.

Further, the first bridge and the second bridge may be formed over separate depressions.

Additionally, the temperature measuring resistors for measuring the fluid temperature may be provided on a bridge formed over a depression formed on the substrate.

There is provided according to another aspect of the present invention a thermally-sensitive type flow meter for measuring a flow rate of a fluid, the flow meter including a sensor chip comprising a substrate carrying sensing elements, the flow meter comprising:

first and second bridges formed over a depression formed on the substrate, the first and second bridges being arranged along the direction of flow so that the first bridge is positioned on an upstream side and the second bridge is positioned on a downstream side;

a third bridge provided between the first and second bridges, the third bridge being parallel to the direction of flow;

first, second and third resistors for generating a heat, the first, second and third resistors provided on the respective one of the first, second and third bridges, the first, second and third resistors being heated by the same voltage source;

first and second temperature measuring resistors for measuring a temperature of the fluid, the first and second temperature measuring resistors being located at positions not influenced by a temperature of the first and second resistors;

a temperature control unit, including the first and second resistors and the first and second temperature measuring resistors, for controlling a temperature of each of the first and second resistors to be constant; and a flow rate determining unit for determining a flow rate of the fluid flowing around the first, second and third bridges, a determination being made based on a voltage difference between a first voltage and a second voltage, the first voltage being measured across one of the first resistor and the second resistor, the second voltage being measured across the third resistor.

According to this invention, when the first resistor is on the upstream side with respect to the third resistor, the voltage difference is obtained by using the voltage applied to the first resistor and the voltage applied to the third resistor. When the second resistor is on the upstream side with respect to the third resistor, the voltage difference is obtained by using the voltage applied to the second resistor and the voltage applied to the third resistor. Thus, an accurate flow measurement is obtained for either the normal direction or the reverse direction of the flow.

In one embodiment, the substrate may be comprised of a semiconductor substrate having a (110) plane and a <100> axis, the depression being formed on a surface corresponding to the (110) plane, the first and second bridge extending in a direction 55 degrees inclined with respect the <100> axis. Alternatively, the substrate may be comprised of a semiconductor substrate having a (110) plane and a <100> axis, the depression being formed on a surface corresponding to the (110) plane, the first and second bridge extending in a direction parallel to the <100> axis.

A flow direction determining unit may further be provided for determining a direction of flow based on whether the voltage difference is a positive value or a negative value.

Additionally, the first bridge and the second bridge may be formed over separate depressions.

Further, the first temperature measuring resistors may be provided on a fourth bridge formed over the depression and the second temperature measuring resistors may be provided on a fifth bridge formed over the depression, the fifth bridge being located at a position opposite to the fourth bridge with respect to the first, second and third bridges.

Other objects, features and advantages of the present invention will become more apparent from the following detailed descriptions when read in conjunction with the accompanying drawings.

DETAILED DESCRIPTION OF THE PREFERRED EMBODIMENTS

Figure 5:
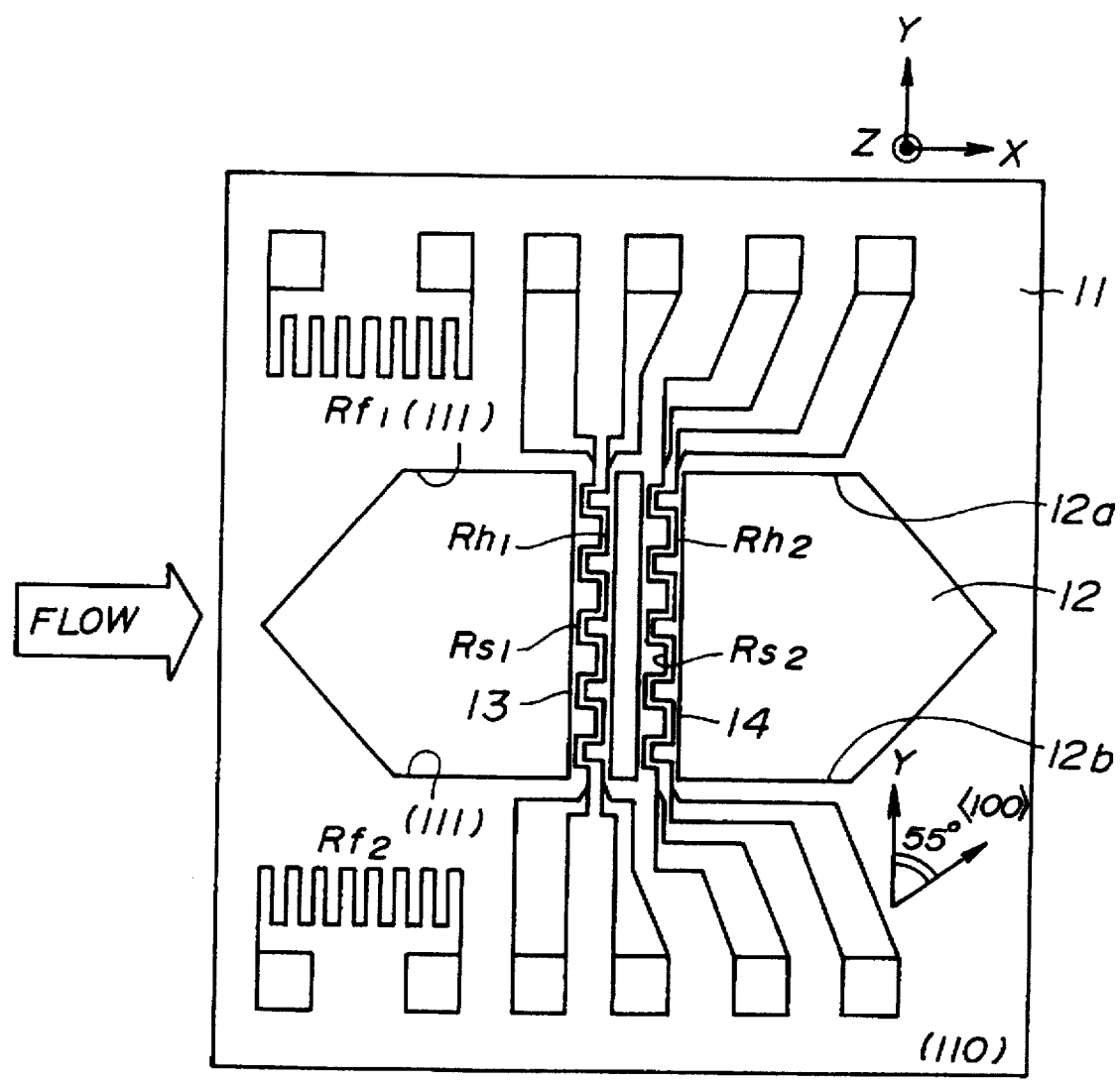
FIG. 5 is a plan view of a sensor chip used in a thermally-sensitive type flow meter according to a first embodiment of the present invention.

A description will now be given, with reference to FIGS. 5 to 10, of a first embodiment of the present invention. FIG. 5 is a plan view of a sensor chip used in a thermally-sensitive type flow meter according to the first embodiment of the present invention.

The sensor chip shown in FIG. 5 is formed by a single crystalline silicon semiconductor substrate 11 having the (110) plane. In FIG. 5, a direction Z (Z-direction) corresponds to a depth direction which is perpendicular to the (110) plane. A depression 12 is formed on a surface which corresponds to the (110) plane. A pair of bridges 13 and 14 are formed over the depression 12 so that a longitudinal direction of the bridges 13 and 14 is perpendicular to a direction (X-direction) of a fluid flow. The bridges 13 and 14 extend parallel to each other. The bridge 13 is positioned on the upstream side of the fluid flow with respect to the bridge 14. The longitudinal direction (Y-direction) of the bridges 13 and 14 is set to a direction inclined about 55 degrees with respect to the <100> axis of the substrate. The longitudinal direction of the bridges 13 and 14 may be parallel to the <100> axis.

A heating element $Rh_1$ and a temperature measuring element $Rs_1$, each of which comprises a resistor, are provided on the upstream bridge 13. The temperature measuring element $Rs_1$ is provided for measuring a temperature of the heating element $Rh_1$. A heating element $Rh_2$ and a temperature measuring element $Rs_2$, each of which comprises a resistor, are provided on the downstream bridge 14. The temperature measuring element $Rs_2$ is provided for measuring a temperature of the heating element $Rh_2$. Temperature measuring elements $Rf_1$ and $Rf_2$ are provided on the surface of the substrate 11 to measure the temperature of the fluid. Thus, the temperature measuring elements $Rf_1$ and $Rf_2$ are located in positions not influenced by the heating elements $Rh_1$ and $Rh_2$.

Figure 6:
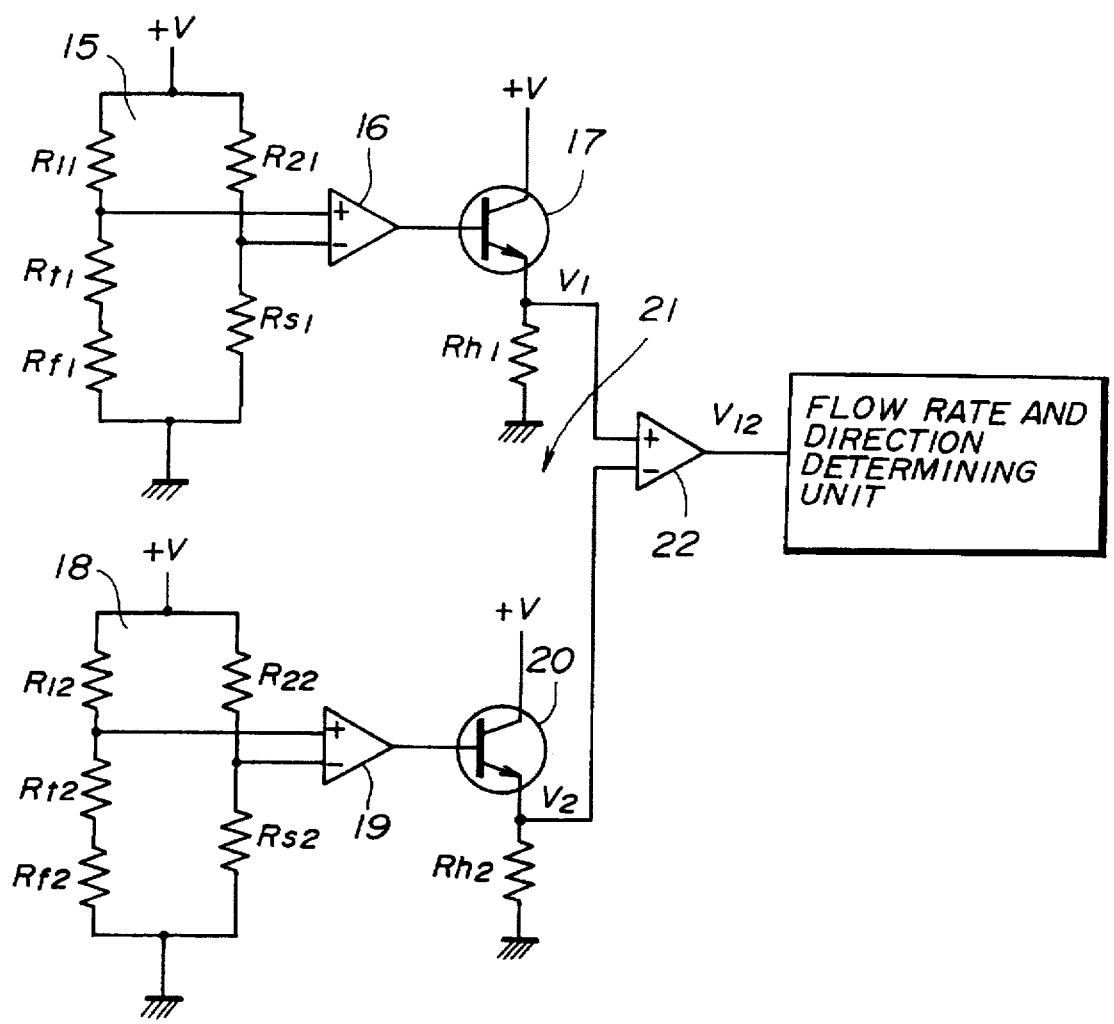
FIG. 6 is a circuit diagram of a driving circuit for the sensor chip shown in FIG. 5.

FIG. 6 is a circuit diagram of a driving circuit for the sensor chip shown in FIG. 5. As shown in FIG. 6, the temperature measuring element $Rs_1$, the temperature measuring element $Rf_1$, fixed resistors $R_{11}$ and $R_{21}$ and a temperature setting resistor $Rt_1$ together form a bridge circuit 15. The bridge circuit 15 is connected to a differential amplifier 16. The differential amplifier 16 is connected to a base of a transistor 17. An emitter of the transistor 17 is connected to the heating element $Rh_1$. Similarly, the temperature measuring element $Rs_2$, the temperature measuring element $Rf_2$, fixed resistors $R_{12}$ and $R_{22}$ and a temperature setting resistor $Rt_2$ together form a bridge circuit 18. The bridge circuit 18 is connected to a differential amplifier 19. The differential amplifier 19 is connected to a base of a transistor 20. An emitter of the transistor 20 is connected to the heating element $Rh_2$. The bridge circuits 15 and 18, the differential amplifiers 16 and 19 and transistors 17 and 20 constitute a temperature control unit 21 for maintaining each of the heating elements $Rh_1$ and $Rh_2$ at a constant temperature. Additionally, the transistor 17 and the transistor 20 are provided with a source voltage provided from the same voltage source +V.

The emitters of the transistors 17 and 20, to which the heating elements $Rh_1$ and $Rh_2$ are respectively connected, are also connected to a differential amplifier 22 serving as a flow rate detecting unit. The differential amplifier 22 outputs an amplified voltage difference $V_{12}$ between a voltage $V_1$ applied to the heating element $Rh_1$ (corresponding to a voltage measured across the heating element $Rh_1$) and a voltage $V_2$ applied to the heating element $Rh_2$ (corresponding to a voltage measured across the heating element $Rh_2$). The voltage difference $V_{12}$ is supplied to a flow rate and direction determining unit. The flow rate and direction determining unit determines a flow rate of the fluid by referring to a relationship between the output of the differential amplifier 22 and a flow rate. Additionally, the flow rate and direction determining unit determines a direction of the flow by checking whether the voltage difference $V_{12}$ is a positive value or a negative value.

A description will now be given of an operation of the flow meter according to the first embodiment of the present invention. It is assumed that the heating elements $Rh_1$ and $Rh_2$ are controlled to maintain a constant temperature higher than a temperature of the fluid. If a fluid flow is generated in the X-direction in this condition, a resistance of the temperature measuring element $Rs_1$ for the heating element is decreased since the upstream bridge 13 is cooled by the fluid flow. Thus, the balance of the bridge circuit 15 is lost, and the voltage difference is detected by the differential amplifier 16. The difference voltage is amplified by the differential amplifier 16 and supplied to the transistor 17. The transistor 17 is driven by the output of the differential amplifier 16 to supply a current to the heating element $Rh_1$. The heating element $Rh_1$ is heated until the temperature reaches the above-mentioned constant temperature. At this time, the voltage $V_1$ applied to the heating element $Rh_1$ is decreased in proportion to an increase in resistance of the heating element $Rs_1$ which returns to an initial value corresponding to a state in which no fluid flow is generated. On the other hand, the temperature of the downstream bridge 14 hardly changes when the fluid velocity is low since the fluid heated by the heating element $Rh_1$ on the upstream bridge 13 is lead around the bridge 14. The temperature fall of the bridge 14 is extremely less than that of the upstream bridge 13 even when the fluid velocity is increased.

Figure 7:
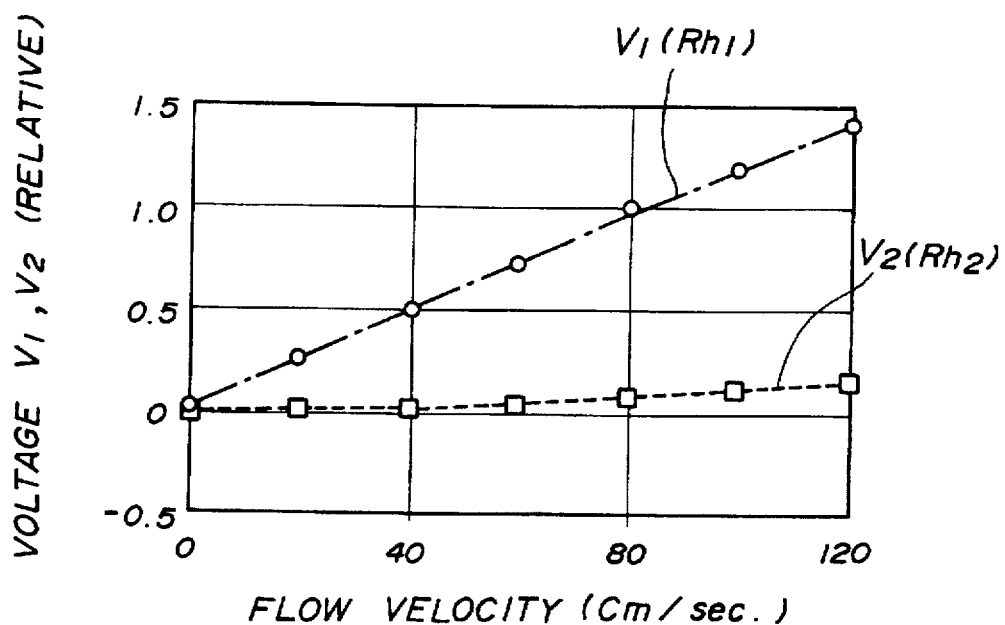
FIG. 7 is a graph showing a relationship between voltages output from differential amplifiers and fluid velocity.
Figure 8:
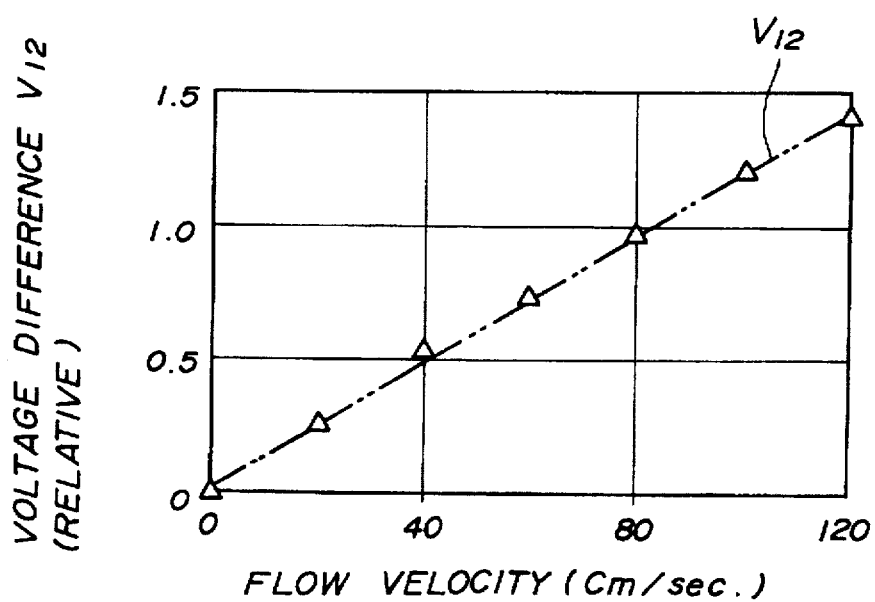
FIG. 8 is a graph showing a relationship between a voltage difference output from a differential amplifier and the fluid velocity.

FIG. 7 is a graph showing a relationship between the voltages $V_1$ and $V_2$ and fluid velocity when the driving circuit shown in FIG. 6 is driven by a 3-Volt battery. FIG. 8 is a graph showing a relationship between the voltage $V_{12}$ and the fluid velocity.

As shown in the graph of FIG. 7, the voltage $V_1$ applied to the upstream heating element $Rh_1$ is increased as the fluid velocity is increased, whereas the voltage $V_2$ applied to the heating element $Rh_2$ is hardly increased as the fluid velocity is increased. Especially, the voltage $V_2$ does not exhibit flow dependency in a low flow rate range.

On the other hand, as shown in FIG. 8, the voltage difference $V_{12}$ output from the differential amplifier 22 exhibits a good linearity from a low flow range to a high flow range with respect to the fluid velocity.

By taking the difference between the voltages $V_1$ and $V_2$, noise or drift in phase of the voltages $V_1$ and $V_2$ due to aging of the elements, offsets of the differential amplifiers or fluctuation in the source voltage can be canceled. Thus, a signal corresponding to only a flow component can be obtained. This results in the good linearity of the voltage difference $V_{12}$. Accordingly, the SN ratio can be remarkably improved as compared to the conventional apparatus. Especially, an accuracy of flow measurement in a low flow range is increased.

It is known that an etching rate of a semiconductor substrate is dependent on each crystal face. When a KOH solution is used as an etchant, an etching rate of the (111) plane is extremely low as is appreciated from the previously mentioned relationship (1). In the present embodiment, the silicon substrate 11 having the (110) plane is used. The depression 12 is formed in the Z-direction which corresponds to a depth direction of the (110) plane. The longitudinal direction of the bridges 13 and 14 corresponds to the direction about 55 degrees slanting from the <100> axis. Thus, the side walls 12a and 12b of the depression 12 can be constituted by the (111) plane.

Figure 1:
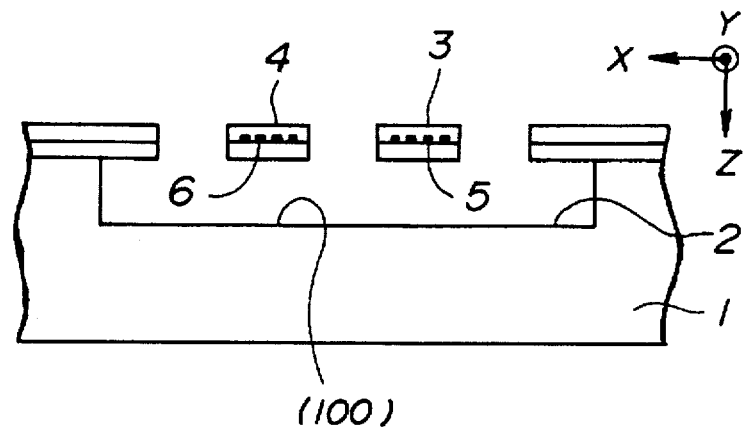
FIG. 1 is a cross-sectional view of a part of a conventional thermally-sensitive type flow meter.
Figure 2:
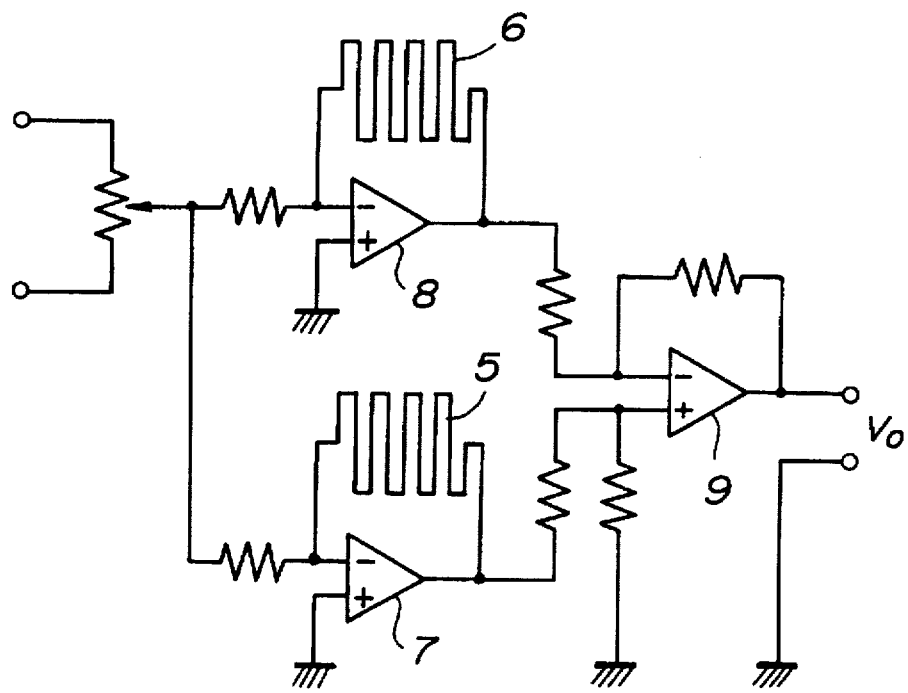
FIG. 2 is a circuit diagram of a driving circuit for resistor elements shown in FIG. 1.
Figure 3:
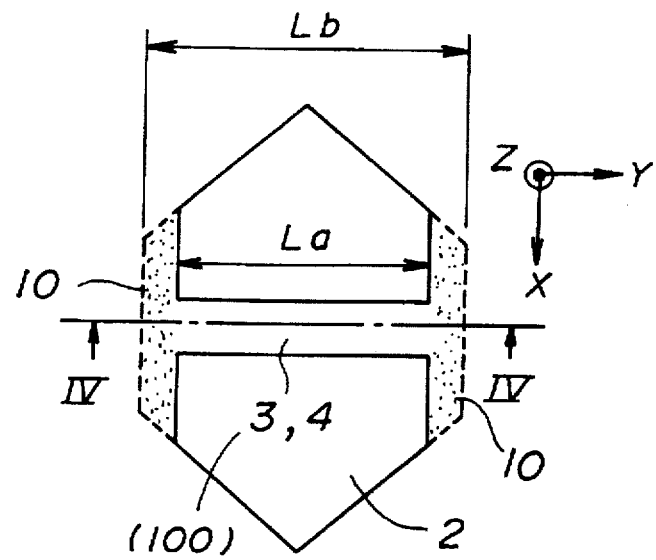
FIG. 3 is a plan view of a depression shown in FIG. 1.
Figure 4:
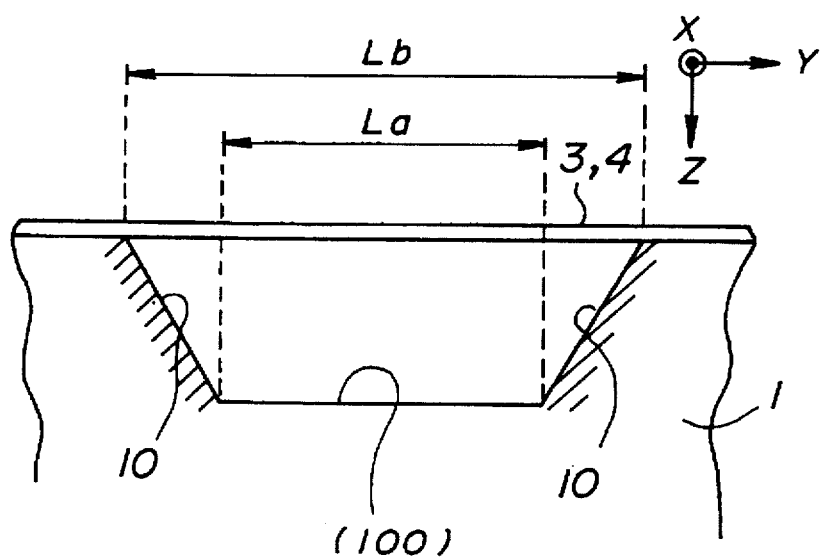
FIG. 4 is a cross-sectional view taken along a line IV—IV of FIG. 3.
Figure 9:
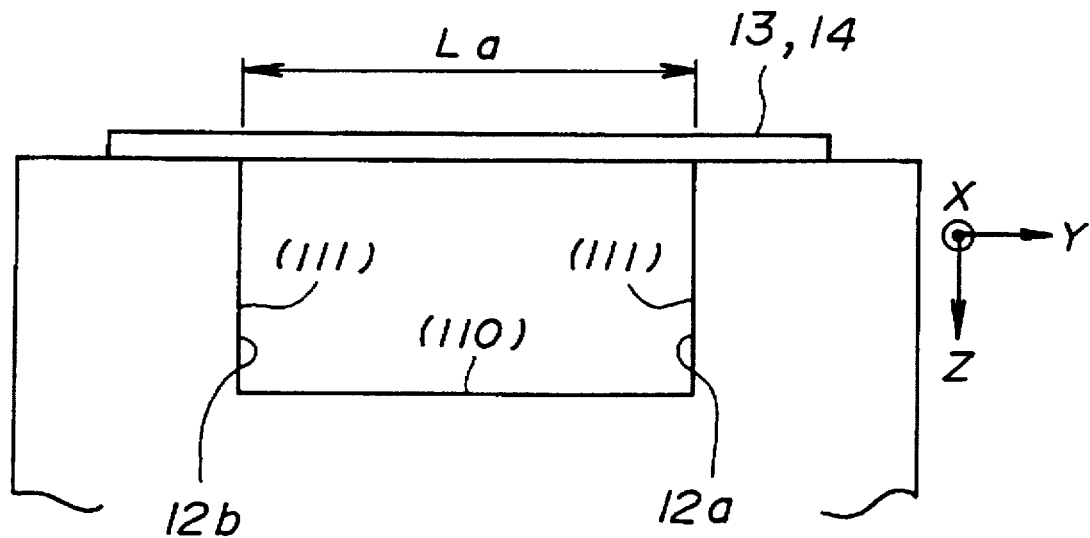
FIG. 9 is a cross-sectional view showing a cross section of an example of a depression formed in the sensor chip shown in FIG. 5.
Figure 10:
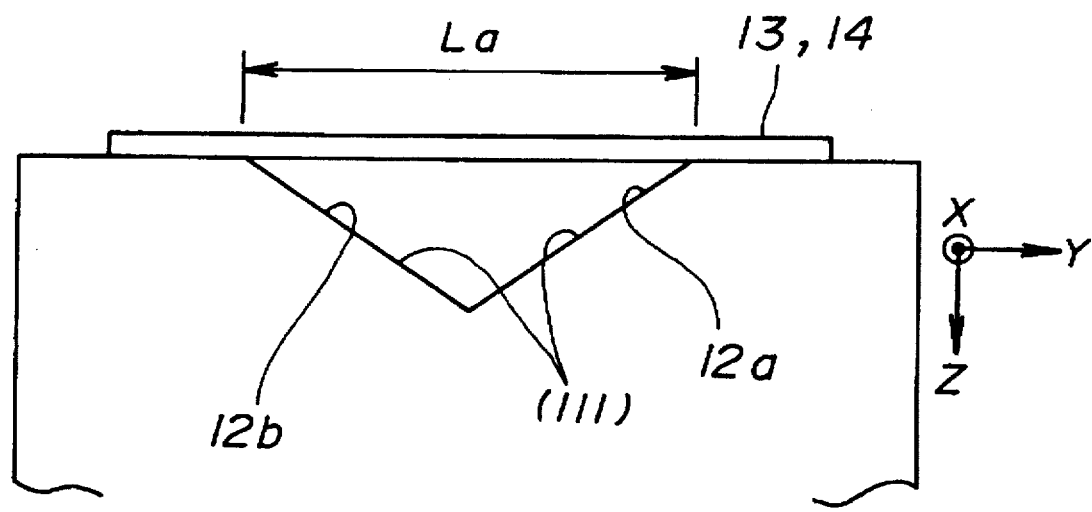
FIG. 10 is a cross-sectional view showing a cross section of another example of the depression formed in the sensor chip sown in FIG. 5.

As discussed above, when an anisotropic etching is applied by using the KOH solution, an etching rate (in the Y-direction) with respect to the side walls 12a and 12b (corresponding to the (111) plane) of the depression 12 can be set to an extremely low speed relative to an etching rate (in the Z-direction) with respect to a bottom surface (corresponding to the (110) plane) of the depression 12. Thus, as shown in FIG. 9, the side walls 12a and 12b can be formed almost perpendicular to the bottom surface of the depression 12 even when the depth of the depression is increased. Accordingly, the length of the bridges 13 and 14 can be accurately set to the design length La. Additionally, the depression 12 can be formed deeper than the depression of the conventional substrate as shown in FIG. 4 since the large side etched portion 10 is not formed. This construction provides a good heat isolation of the bridges 13 and 14 and reduces variation in the temperature of the bridges 13 and 14.

When the longitudinal direction (Y-direction) of the bridges 13 and 14 is set parallel to the <100> axis of the substrate, the bottom surface of the depression 12 corresponds to the (111) plane. In this condition, the (111) plane crosses the (110) surface at an angle of 35 degrees and the depression 12 can be formed in a V-shape with an anisotropic etching. Thus, the depression 12 can be formed in a V-shape. In this case also the under-etching of the depression 12 can be prevented. Thus, the length of the bridges 13 and 14 in the Y-direction can be set to the design length La.

Additionally, as apparent from the graph of FIG. 7, the voltage $V_2$ of the heating element $Rh_2$ of the downstream bridge 14 is small even when the flow rate is in a high flow velocity range since the downstream bridge 14 is not influenced by an increase of the flow rate, whereas the voltage of the heating element $Rh_1$ of the upstream bridge 13 is increased in proportion to the flow rate since the upstream bridge 13 is cooled by the fluid flow. Thus, if the voltage difference obtained by subtracting the voltage $V_2$ from the voltage $V_1$ is a positive value, it can be determined that the direction of flow is from the bridge 13 to the bridge 14. On the other hand, if the voltage difference obtained by subtracting the voltage $V_2$ from the voltage $V_1$ is a negative value, it can be determined that the direction of flow is from the bridge 14 to the bridge 13. Accordingly, the direction of flow can be determined by checking whether the voltage difference $V_{12}$ output from the differential amplifier 22 is a positive value or a negative value. This determination of the direction of flow can eliminate a measurement error due to a reverse flow when the flow is obtained by an integral of the flow rate.

Figure 11:
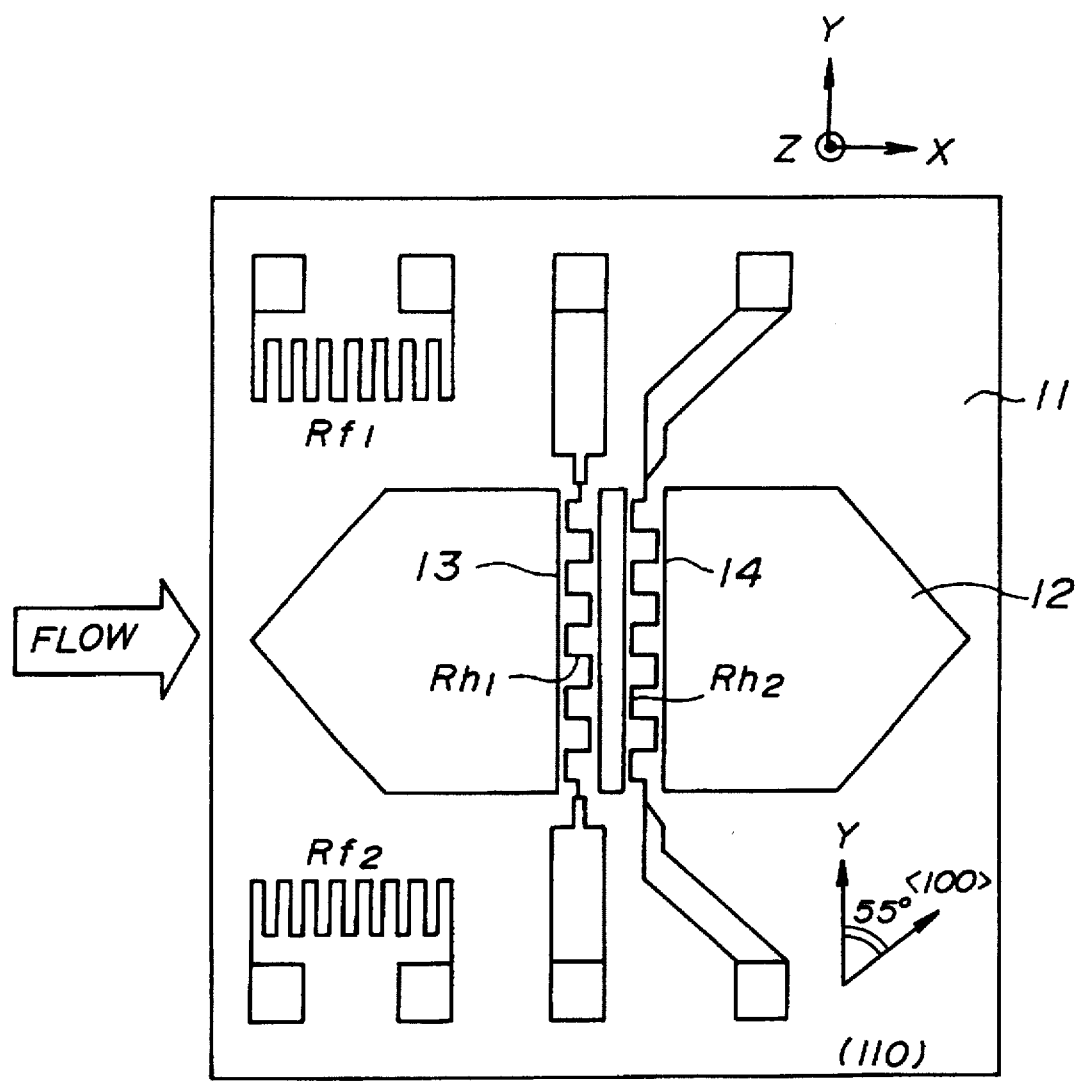
FIG. 11 is a plan view of a sensor chip according to a second embodiment of the present invention.
Figure 12:
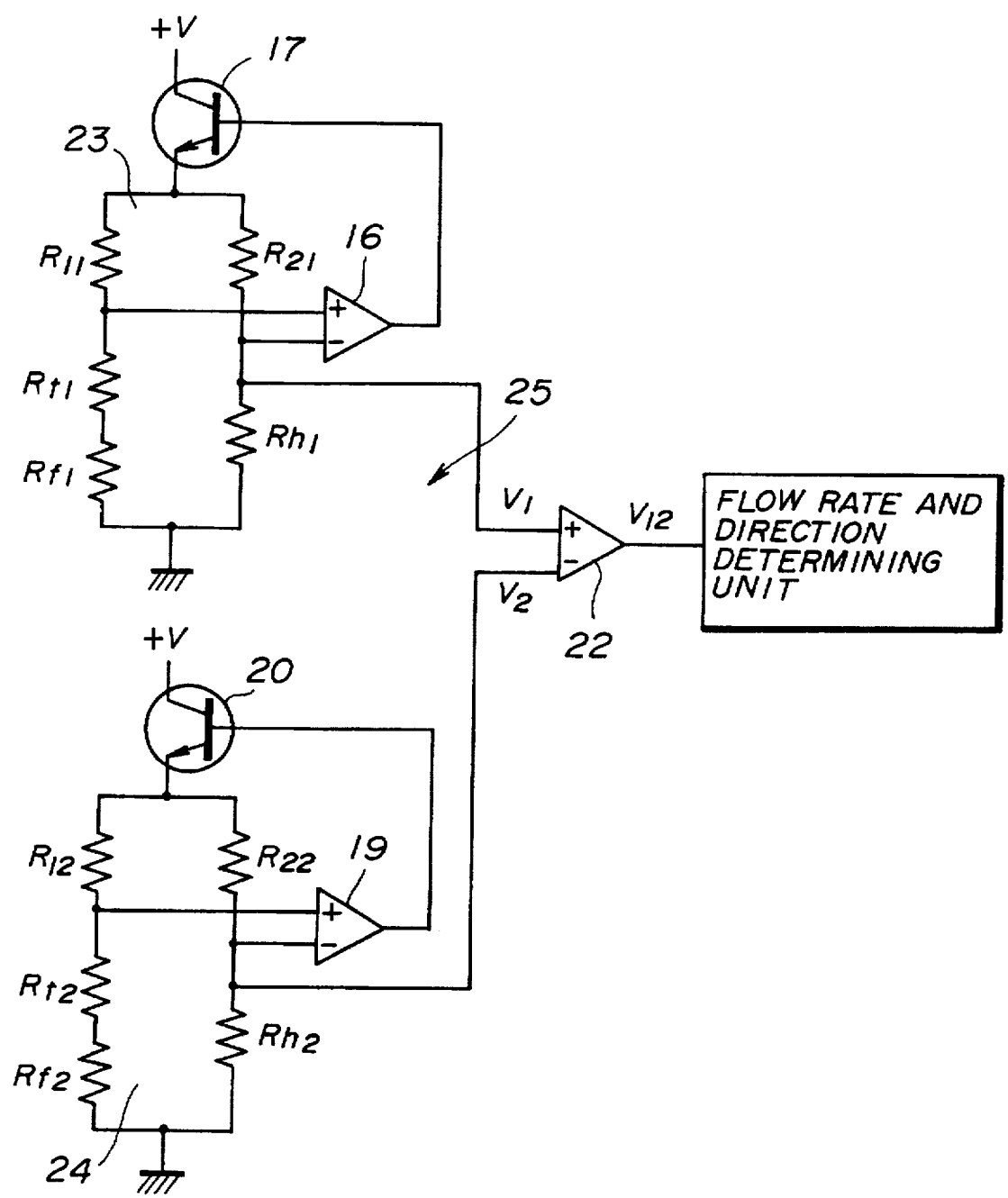
FIG. 12 is a circuit diagram of a driving circuit for driving the sensor chip shown in FIG. 11.

A description will now be given, with reference to FIGS. 11 and 12, of a second embodiment according to the present invention. FIG. 11 is a plan view of a sensor chip used in a flow meter according to the second embodiment of the present invention. FIG. 12 is a circuit diagram of a driving circuit for driving the sensor chip shown in FIG. 11. In FIGS. 11 and 12, parts that are the same as the parts shown in FIGS. 5 and 6 are given the same reference numerals, and descriptions thereof will be omitted.

In the sensor chip shown in FIG. 11, the heating elements $Rh_1$ and $Rh_2$ are provided on the respective bridges 13 and 14. However, the temperature measuring elements $Rs_1$ and $Rs_2$ are not provided. Other construction of the sensor chip according to the second embodiment is the same as that of the sensor chip according to the above-mentioned first embodiment.

As shown in FIG. 12, the heating element $Rh_1$, the temperature measuring element $Rf_1$, the fixed resistors $R_{11}$ and $R_{21}$ and the temperature setting resistor $Rt_1$ together form a bridge circuit 23. The bridge circuit 23 is connected to the differential amplifier 16. The differential amplifier 16 is connected to the base of the transistor 17. The transistor 17 is connected between the voltage source +V and the bridge circuit 23. Similarly, the heating element $Rh_2$, the temperature measuring element $Rf_2$, the fixed resistors $R_{12}$ and $R_{22}$ and the temperature setting resistor $Rt_2$ together form a bridge circuit 24. The bridge circuit 24 is connected to the differential amplifier 19. The transistor 20 is connected between the voltage source +V and the bridge circuit 24. In this case, the bridge circuits 23 and 24, the differential amplifiers 16 and 19 and the transistors 17 and 20 constitute a temperature control unit 25 for maintaining each of the heating elements $Rh_1$ and $Rh_2$ at a constant temperature.

Additionally, the heating element $Rh_1$ of the bridge circuit 23 and the heating element $Rh_2$ of the bridge circuit 24 are connected to the differential amplifier 22. The differential amplifier 22 outputs an amplified voltage difference $V_{12}$ between the voltage $V_1$ applied to the heating element $Rh_1$ (corresponding to a voltage measured across the heating element $Rh_1$) and the voltage $V_2$ applied to the heating element $Rh_2$ (corresponding to a voltage measured across the heating element $Rh_2$). The voltage difference $V_{12}$ is supplied to the flow rate and direction determining unit.

A description will now be given of an operation of the flow meter according to the second embodiment of the present invention. When a fluid flow is generated in the X-direction, the upstream bridge 13 is cooled by the fluid flow. Thus, the resistance of the heating element $Rh_1$ is varied and the voltage $V_1$ applied to the heating element $Rh_1$ is also varied. On the other hand, the resistance of the heating element $Rh_2$ provided on the downstream bridge 14 is maintained almost the same, and thus the voltage $V_2$ applied to the heating element $Rh_2$ is hardly changed. Accordingly, the voltage difference $V_{12}$ output from the differential amplifier 22 has a good linearity with respect to the flow velocity similar to the graph shown in FIG. 8.

As mentioned above, since a change in the temperature of the heating elements $Rh_1$ and $Rh_2$ is directly measured by a change in the resistance of the heating elements, there is no time delay in measuring the temperature of the heating elements. That is, there is no time delay as is in the first embodiment in which a temperature of the heating element is measured by the temperature measuring element which is adjacent to but physically separated from the heating element. Thus, the heating elements $Rh_1$ and $Rh_2$ of the present embodiment can be driven by a pulsed voltage, and a width of the pulse can be decreased. Thus, the flow meter according to the present embodiment can be operated with a reduced power consumption.

Figure 13:
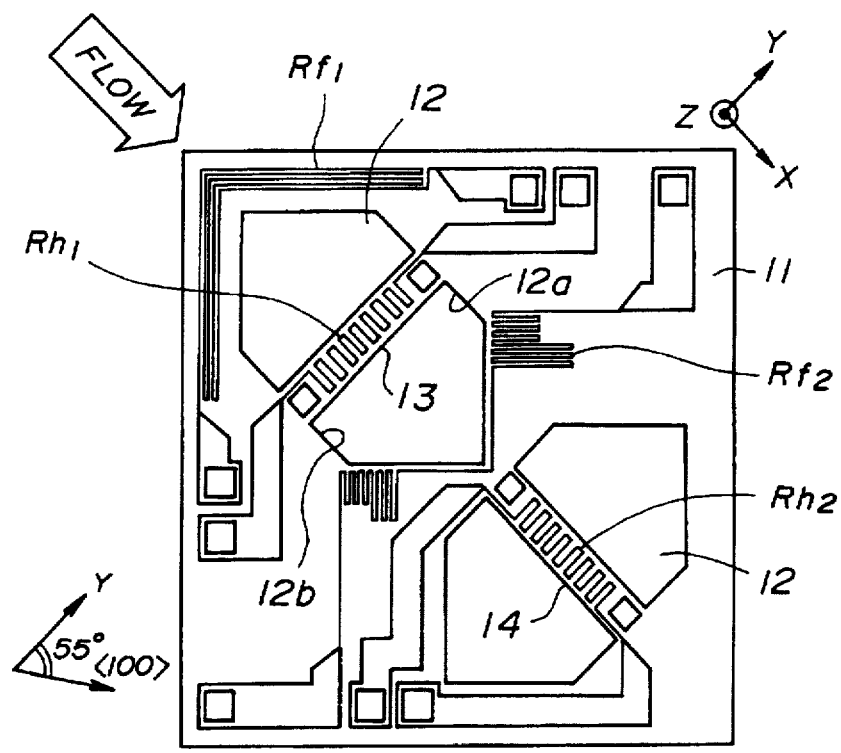
FIG. 13 is a plan view of a sensor chip used in a flow meter according to a third embodiment of the present invention.

A description will now be given, with reference to FIG. 13, of a third embodiment of the present invention. FIG. 13 is a plan view of a sensor chip used in a flow meter according to the third embodiment of the present invention. In FIG. 13, parts that are the same as the parts shown in FIG. 5 are given the same reference numerals, and descriptions thereof will be omitted.

The sensor chip shown in FIG. 13 is formed of a silicon substrate having the (110) plane similar to the sensor chips according to the first and second embodiments. In this sensor chip, two depressions 12 are formed on a surface. The bridge 13 is formed over the depression 12 positioned on the upstream side. The bridge 13 extends generally perpendicular to the direction (X-direction) of fluid flow. The longitudinal direction of the upstream bridge 13 is slanted about 55 degrees with respect to the <100> axis of the substrate 11. The longitudinal direction of the bridge 13 may be parallel to the <100> axis. The bridge 14 is formed over the depression 12 positioned on the downstream side of the depression 12 over which the upstream bridge 13 is formed. The longitudinal direction of the downstream bridge 14 is perpendicular to the longitudinal direction of the upstream bridge 13. That is, the downstream bridge 14 is formed along the direction (X-direction) of fluid flow. The heating element $Rh_1$ is provided on the bridge 13 and the heating element $Rh_2$ is provided on the bridge 14.

The temperature measuring element $Rf_1$ is provided on the substrate 11 at a position not influenced by the temperature of the heating elements $Rh_1$ and $Rh_2$. The temperature measuring element $Rf_2$ is provided on the substrate 11 at a position not influenced by the temperature of the heating elements $Rh_1$ and $Rh_2$. The sensor chip according to the present embodiment is driven by a driving circuit having the same structure as the driving circuit shown in FIG. 12.

In the present embodiment, the heating element $Rh_2$ can be insensitive with respect to the fluid flow by forming the bridge 14 perpendicular to the bridge 13. This is because the bridge 14 is aligned with the direction (X-direction) of fluid flow. That is, a heat transmitted to the fluid on the upstream portion of the heating element $Rh_2$ is transported along the bridge 14, and thus the downstream portion of the heating element $Rh_2$ is not cooled by the fluid flow. Thus, the heating element $Rh_2$ of the downstream bridge 14 has an extremely low sensitivity (flow dependency) with respect to the flow rate. In this case, the voltage $V_2$ applied to the heating element $Rh_2$ can be almost zero not only in a low flow range but also in a high flow range. Additionally, an offset voltage included in the voltage $V_1$ applied to the heating element $Rh_1$ is equal to an offset voltage included in the voltage $V_2$ applied to the heating element $Rh_2$. Thus, a good linearity of the output voltage $V_{12}$, which is a difference between the voltage $V_1$ and the voltage $V_2$, can be obtained from a low flow range to a high flow range.

On the other hand, the heating element $Rh_1$ of the upstream bridge 13, which is perpendicular to the direction of fluid flow, has an extremely high sensitivity with respect to the flow rate. The longitudinal direction of the bridge 13 is set to about 55 degrees with respect to the <100> axis. Thus, the side walls of the depression 12 for the bridge 13 are constituted by the (111) plane as shown in FIG. 9. This structure can eliminate under-etching of the depression with respect to the longitudinal direction (Y-direction), and permits an increase in a depth of the depression in the Z-direction. Thus, the heat isolation for the bridge 13 can be increased. Accordingly, an SN ratio of the sensor chip according to the present invention is improved, and an accurate flow measurement can be achieved.

The sensor chip according to the present embodiment has bridges 13 and 14 having only the heating elements $Rh_1$ and $Rh_2$. However, the temperature measuring elements $Rs_1$ and $Rs_2$ may be provided adjacent to the respective heating elements $Rh_1$ and $Rh_2$ as is in the sensor chip according to the first embodiment.

Figure 14:
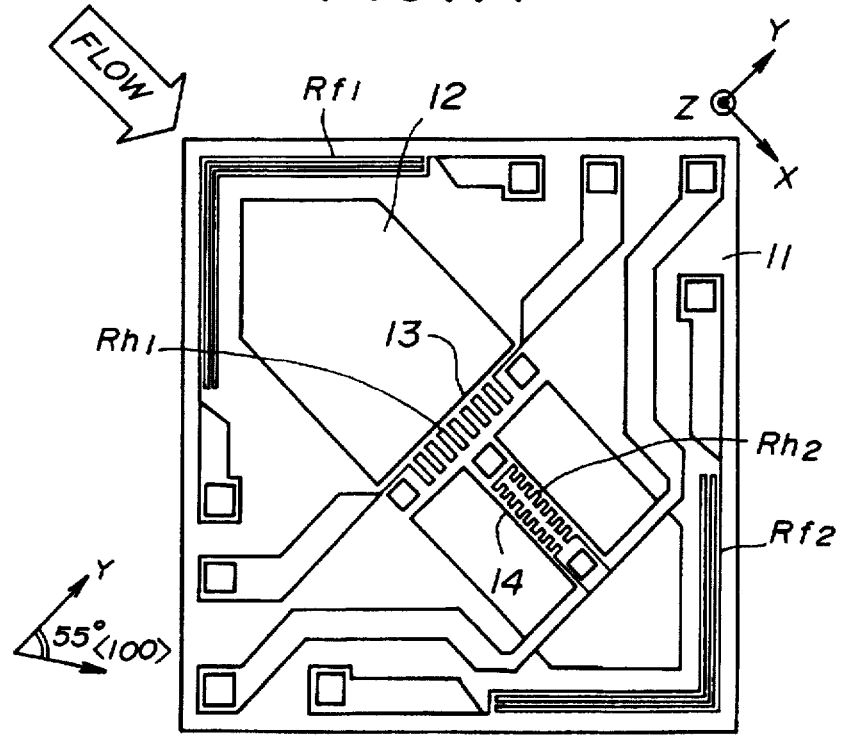
FIG. 14 is a plan view of a variation of the sensor chip shown in FIG. 13.

Additionally, as shown in FIG. 14, the bridges 13 and 14 may be provided over the same depression 12. In this case, the longitudinal direction (Y-direction) of the upstream bridge 13 is off set about 55 degrees or is parallel to the axis <100>.

Figure 15:
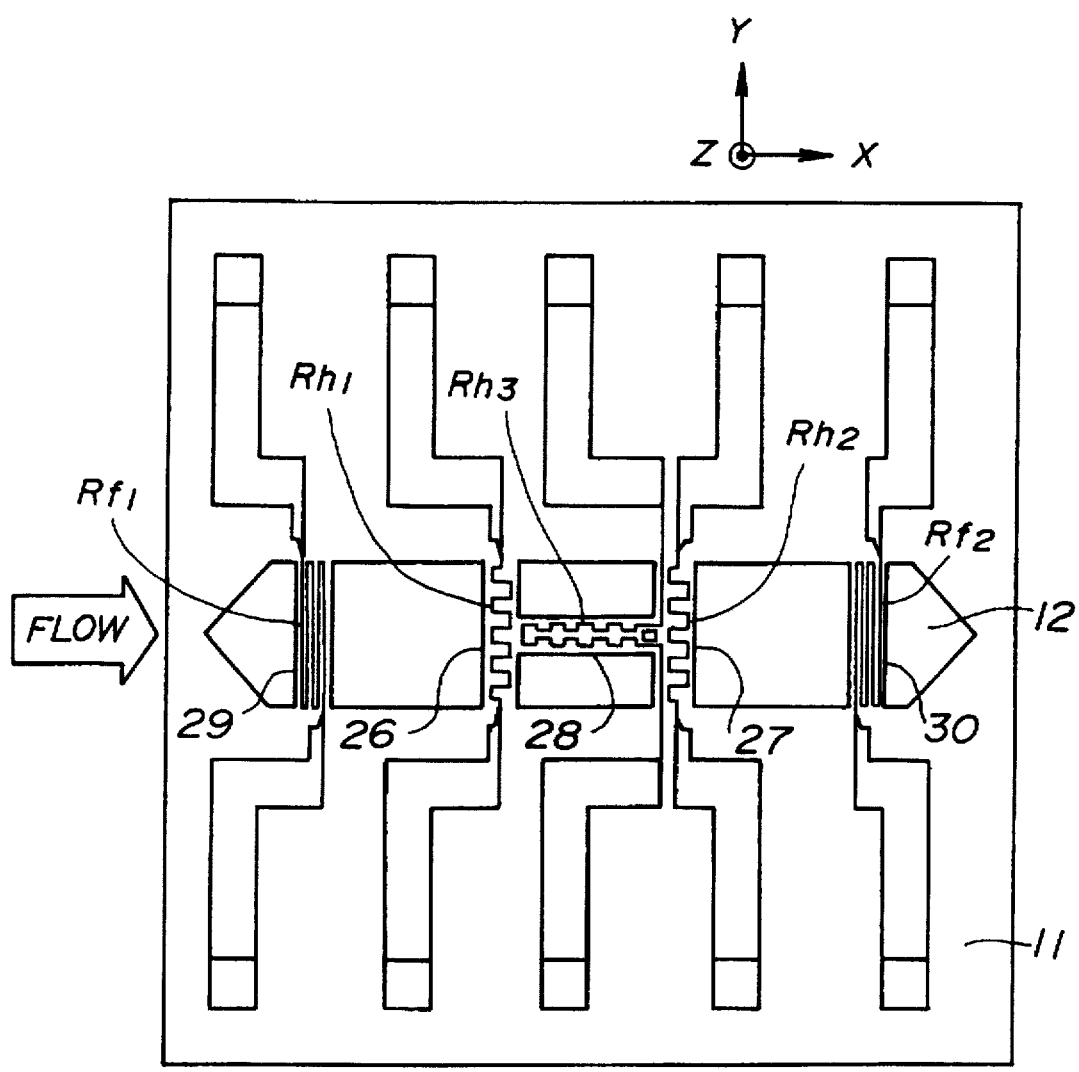
FIG. 15 is a plane view Of a sensor chip used in a flow meter according to a fourth embodiment of the present invention.

A description will now be given, with reference to a fourth embodiment of the present invention. FIG. 15 is a plane view of a sensor chip used in a flow meter according to the fourth embodiment of the present invention. In FIG. 15, parts that are the same as the parts shown in FIG. 5 are given the same reference numerals, and descriptions thereof will be omitted.

In the sensor chip shown in FIG. 15, the depression 12 is formed in the center of the substrate 11 along the direction (X-direction) of the fluid flow. In the center of the depression are formed a first bridge 26 and a second bridge 27. The first and second bridges are perpendicular to the direction (X-direction) of fluid flow. A third bridge 28 is connected to the first and second bridges 26 and 27. The heating elements $Rh_1$ and $Rh_2$ are provided on the first and second bridges, respectively. A heating element $Rh_3$ is provided on the third bridge.

Additionally, bridges 29 and 30 are formed over the depression 12 perpendicular to the direction (X-direction) of the fluid flow. The bridge 29 is located at a position upstream of the bridge 26 it is not influenced by the temperature of the heating elements $Rh_1$, $Rh_2$ and $Rh_3$. The bridge 30 is located at a position downstream of the bridge 27 where it is not influenced by the temperature of the heating elements $Rh_1$, $Rh_2$ and $Rh_3$. The temperature measuring element $Rf_1$ is provided on the bridge 29, and the temperature measuring element $Rf_2$ is provided on the bridge 30.

The sensor chip according to the present embodiment can be driven by a driving circuit having a basic structure similar to the driving circuit shown in FIG. 12. The heating elements $Rh_1$ and the $Rh_2$ together correspond to the heating element $Rh_1$, which has a high flow dependency, of the driving circuit shown in FIG. 12. The heating element $Rh_3$ corresponds to the heating element $Rh_2$, which has a low flow dependency, of the driving circuit shown in FIG. 12. That is, a bridge circuit is formed by the heating elements $Rh_1$ and $Rh_2$ and the temperature measuring element $Rf_1$. Another bridge circuit is formed by the heating element $Rh_3$ and the temperature measuring element $Rf_2$. These bridge circuits constitute a temperature controlling unit for maintaining the temperature of the heating elements to be constant similar to that of the circuit shown in FIG. 12. Additionally, the temperature controlling unit is connected to a flow rate and direction determining unit. The flow rate and direction determining unit obtains the voltage difference $V_{13}$ or $V_{23}$ between the voltage applied to the heating element $Rh_1$ or $Rh_2$ and the voltage $V_3$ applied to the heating element $Rh_3$ so as to determine the flow rate. The direction of fluid flow is also determined by checking whether the voltage difference $V_{13}$ is a positive value or a negative value.

The substrate may be formed of a single crystalline silicon substrate having the (110) plane. In this case the longitudinal direction of the bridges 26 and 27 may be offset about 55 degrees or parallel to the <100> axis of the substrate 11.

In the above-mentioned construction, the third heating element $Rh_3$ of the third bridge 28 is insensitive with respect to the flow rate since the third bridge 28 extends along the direction (X-direction) of fluid flow. When the direction of fluid flow is the X-direction, the voltage $V_1$ is obtained from the heating element $Rh_1$ of the first bridge 26 so as to obtain the voltage difference $V_{13}$. On the other hand, when the direction of fluid flow is opposite to the X-direction, that is, the flow is reversed, the voltage $V_2$ is obtained from the heating element $Rh_2$ of the second bridge 27 so as to obtain the voltage difference $V_{23}$. Thus, in the present embodiment, an accurate flow measurement can be achieved for either the normal flow or the reverse flow.

Additionally, in the present embodiment, since the temperature measuring elements $Rf_1$ and $Rf_2$ for measuring the temperature of the fluid are provided on the respective bridges 29 and 30, a change in the temperature of the fluid can be immediately detected. This is because the temperature measuring elements $Rf_1$ and $Rf_2$ are provided on the bridges 29 and 30 having a small heat capacity. Such a quick response of the measurement of fluid temperature is required, for example, when flow of a gas such as LPG is measured. If a large amount of LPG is used in a short time, the temperature of the LPG may be lower than the ambient temperature because of the LPG in the liquid phase being cooled due to the vaporization to the gas phase. In such a case, if the temperature measuring element is provided on the surface of the substrate 11 having a large heat capacity, an actual temperature cannot be reflected to the measurement. However, in the sensor chip according to the present embodiment, since the temperature measuring elements $Rf_1$ and $Rf_2$ are formed on the bridges 29 and 30, the temperature of the fluid is always immediately reflected to the resistance of the temperature measuring elements $Rf_1$ and $Rf_2$. This provides an accuracy to the flow measurement performed by the flow meter according to the present embodiment.

It should be noted that any combination of the above-mentioned embodiments may be in the scope of the present invention.

The present invention is not limited to the specifically disclosed embodiments, and variations and modifications may be made without departing from the scope of the present invention.

What is claimed is:

1. A thermally-sensitive type flow meter for measuring a flow rate of a fluid, said flow meter including a sensor chip comprising a substrate carrying sensing elements, said flow meter comprising:

first and second bridges formed over a depression formed on said substrate, said first and second bridges being arranged along the direction of flow so that said first bridge is positioned on an upstream side and said second bridge is positioned on a downstream side;

first and second resistors for generating a heat, said first and second resistors provided on the respective one of said first and second bridges, said first and second resistors being heated by the same voltage source;

first and second temperature measuring resistors provided adjacent to the respective one of said first and second resistors;

third and fourth temperature measuring resistors for measuring a temperature of the fluid, said third and fourth temperature measuring resistors being located at positions not influenced by a temperature of said first and second resistors;

a temperature control unit, including said first, second, third and fourth temperature measuring resistors, for controlling a temperature of each of said first and second resistors to be constant; and a flow rate determining unit for determining a flow rate of the fluid flowing around said first and second bridges, a determination being made based on a voltage difference between a first voltage and a second voltage, said first voltage being measured across said first resistor, said second voltage being measured across said second resistor.

2. The flow meter as claimed in claim 1, wherein said first and second bridges extend perpendicular to the direction of flow.

3. The flow meter as claimed in claim 1, wherein said first bridge extends perpendicular to the direction of flow and said second bridge extends parallel to the direction of flow.

4. The flow meter as claimed in claim 1, wherein said substrate is comprised of a semiconductor substrate having a (110) plane and a <100> axis, said depression being formed on a surface corresponding to the (110) plane, said first bridge extending in a direction 55 degrees inclined with respect to the <100> axis.

5. The flow meter as claimed in claim 1, wherein said substrate is comprised of a semiconductor substrate having a (110) plane and a <100> axis, said depression being formed on a surface corresponding to the (110) plane, said first bridge extending in a direction parallel to the <100> axis.

6. The flow meter as claimed in claim 1, further comprising a flow direction determining unit for determining a direction of flow based on whether said voltage difference is a positive value or a negative value.

7. The flow meter as claimed in claim 1, wherein said first bridge and said second bridge are formed over separate depressions.

8. The flow meter as claimed in claim 1, wherein said third and fourth temperature measuring resistors are provided on a bridge formed over a depression formed on said substrate.

9. A thermally-sensitive type flow meter for measuring a flow rate of a fluid, said flow meter including a sensor chip comprising a substrate carrying sensing elements, said flow meter comprising:

first and second bridges formed over a depression formed on said substrate, said first and second bridges being arranged along the direction of flow so that said first bridge is positioned on an upstream side and said second bridge is positioned on a downstream side;

first and second resistors for generating a heat, said first and second resistors provided on the respective one of said first and second bridges, said first and second resistors being heated by the same voltage source;

first and second temperature measuring resistors for measuring a temperature of the fluid, said first and second temperature measuring resistors being located at positions not influenced by a temperature of said first and second resistors;

a temperature control unit, including said first and second resistors and said first and second temperature measuring resistors, for controlling a temperature of each of said first and second resistors to be constant; and a flow rate determining unit for determining a flow rate of the fluid flowing around said first and second bridges, a determination being made based on a voltage difference between a first voltage and a second voltage, said first voltage being measured across said first resistor, said second voltage being measured across said second resistor.

10. The flow meter as claimed in claim 9, wherein said first and second bridges extend perpendicular to the direction of flow.

11. The flow meter as claimed in claim 9, wherein said first bridge extends perpendicular to the direction of flow and said second bridge extends parallel to the direction of flow.

12. The flow meter as claimed in claim 9, wherein said substrate is comprised of a semiconductor substrate having a (110) plane and a <100> axis, said depression being formed on a surface corresponding to the (110) plane, said first bridge extending in a direction 55 degrees inclined with respect to the <100> axis.

13. The flow meter as claimed in claim 9, wherein said substrate is comprised of a semiconductor substrate having a (110) plane and a <100> axis, said depression being formed on a surface corresponding to the (110) plane, said first bridge extending in a direction parallel to the <100> axis.

14. The flow meter as claimed in claim 9, further comprising a flow direction determining unit for determining a direction of flow based on whether said voltage difference is a positive value or a negative value.

15. The flow meter as claimed in claim 9, wherein said first bridge and said second bridge are formed over separate depressions.

16. The flow meter as claimed in claim 9, wherein said first and second temperature measuring resistors are provided on a bridge formed over a depression formed on said substrate.

17. A thermally-sensitive type flow meter for measuring a flow rate of a fluid, said flow meter including a sensor chip comprising a substrate carrying sensing elements, said flow meter comprising:

first and second bridges formed over a depression formed on said substrate, said first and second bridges being arranged along the direction of flow so that said first bridge is positioned on an upstream side and said second bridge is positioned on a downstream side;

a third bridge provided between said first and second bridges, said third bridge being parallel to the direction of flow;

first, second and third resistors for generating a heat, said first, second and third resistors provided on the respective one of said first, second and third bridges, said first, second and third resistor being heated by the same voltage source;

first and second temperature measuring resistors for measuring a temperature of the fluid, said first and second temperature measuring resistors being located at positions not influenced by a temperature of said first and second resistors;

a temperature control unit, including said first and second resistors and said first and second temperature measuring resistors, for controlling a temperature of each of said first and second resistors to be constant; and a flow rate determining unit for determining a flow rate of the fluid flowing around said first, second and third bridges, a determination being made based on a voltage difference between a first voltage and a second voltage, said first voltage being measured across one of said first resistor and said second resistor, said second voltage being measured across said third resistor.

18. The flow meter as claimed in claim 17, wherein said substrate is comprised of a semiconductor substrate having a (110) plane and a <100> axis, said depression being formed on a surface corresponding to the (110) plane, said first and second bridges extending in a direction 55 degrees inclined with respect to the <100> axis.

19. The flow meter as claimed in claim 17, wherein said substrate is comprised of a semiconductor substrate having a (110) plane and a <100> axis, said depression being formed on a surface corresponding to the (110) plane, said first and second bridges extending in a direction parallel to the <100> axis.

20. The flow meter as claimed in claim 17, further comprising a flow direction determining unit for determining a direction of flow based on whether said voltage difference is a positive value or a negative value.

21. The flow meter as claimed in claim 17, wherein said first bridge and said second bridge are formed over separate depressions.

22. The flow meter as claimed in claim 17, wherein said first temperature measuring resistor is provided on a fourth bridge formed over said depression and said second temperature measuring resistor is provided on a fifth bridge formed over said depression, said fifth bridge being located at a position opposite to said fourth bridge with respect to said first, second and third bridges.

* * * * *

UNITED STATES PATENT AND TRADEMARK OFFICE
CERTIFICATE OF CORRECTION

PATENT NO.  : 5,703,288
DATED       : DECEMBER 30, 1997
INVENTOR(S) : Hiroyuki HORIGUCHI, et al.

It is certified that error appears in the above-identified patent and that said Letters Patent is hereby corrected as shown below:

Cover page, section [56], under "FOREIGN PATENT DOCUMENTS", "55-11938 9/1981 Japan" should be --55-119381 9/1981 Japan--.

Signed and Sealed this

Fourteenth Day of April, 1998

Attest:

BRUCE LEHMAN

*Attesting Officer*    Commissioner of Patents and Trademarks